United States Patent
Eagle et al.

(10) Patent No.: US 10,150,893 B2
(45) Date of Patent: Dec. 11, 2018

(54) STRUCTURAL ADHESIVES HAVING IMPROVED WASH-OFF RESISTANCE AND METHOD FOR DISPENSING SAME

(71) Applicant: Dow Global Technologies LLC, Midland, MI (US)

(72) Inventors: Glenn G. Eagle, Bloomfield Hills, MI (US); Michael R. Golden, Waterford, MI (US); Andreas Lutz, Galgenen (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/312,800

(22) PCT Filed: Jul. 14, 2015

(86) PCT No.: PCT/US2015/040306
§ 371 (c)(1),
(2) Date: Nov. 21, 2016

(87) PCT Pub. No.: WO2016/014284
PCT Pub. Date: Jan. 28, 2016

(65) Prior Publication Data
US 2017/0204301 A1 Jul. 20, 2017

Related U.S. Application Data

(60) Provisional application No. 62/027,820, filed on Jul. 23, 2014.

(51) Int. Cl.
| | |
|---|---|
| *C09J 11/08* | (2006.01) |
| *C09J 5/06* | (2006.01) |
| *C09J 163/00* | (2006.01) |
| *C08L 75/04* | (2006.01) |
| *C08G 18/80* | (2006.01) |
| *C08G 18/10* | (2006.01) |
| *B05D 1/18* | (2006.01) |
| *B05D 3/02* | (2006.01) |
| *B29C 65/48* | (2006.01) |
| *B29C 65/00* | (2006.01) |
| *C09J 5/00* | (2006.01) |
| *C08K 7/00* | (2006.01) |
| *B29K 105/00* | (2006.01) |
| *B29L 31/30* | (2006.01) |

(52) U.S. Cl.
CPC .............. *C09J 11/08* (2013.01); *B05D 1/18* (2013.01); *B05D 3/0254* (2013.01); *B29C 65/4815* (2013.01); *B29C 66/43* (2013.01); *C08G 18/10* (2013.01); *C08G 18/8067* (2013.01); *C08L 75/04* (2013.01); *C09J 5/00* (2013.01); *C09J 5/06* (2013.01); *C09J 163/00* (2013.01); *B29K 2105/0097* (2013.01); *B29L 2031/30* (2013.01); *C08K 7/00* (2013.01); *C08K 2201/005* (2013.01); *C09J 2201/61* (2013.01); *C09J 2203/10* (2013.01); *C09J 2463/00* (2013.01); *C09J 2467/00* (2013.01)

(58) Field of Classification Search
CPC ...................................................... C09J 11/08
See application file for complete search history.

(56) References Cited

U.S. PATENT DOCUMENTS

| | | | |
|---|---|---|---|
| 3,686,359 A | 8/1972 | Soldatos et al. | |
| 4,734,332 A | 3/1988 | Bagga et al. | |
| 4,888,746 A | 12/1989 | Wurster et al. | |
| 5,021,513 A | 6/1991 | Bagga | |
| 5,112,932 A | 5/1992 | Koenig et al. | |
| 5,202,390 A | 4/1993 | Mulhaupt et al. | |
| 5,278,257 A | 1/1994 | Mulhaupt et al. | |
| 7,910,656 B2 | 3/2011 | Lutz et al. | |
| 8,088,245 B2 | 1/2012 | Lutz et al. | |
| 8,404,787 B2 | 3/2013 | Lutz et al. | |
| 8,680,180 B2 | 3/2014 | Yamaguchi et al. | |
| 2004/0266899 A1* | 12/2004 | Muenz ................... | C08G 59/40 521/135 |
| 2005/0070634 A1 | 3/2005 | Lutz et al. | |
| 2006/0189722 A1 | 8/2006 | Kye | |
| 2011/0297317 A1* | 12/2011 | Lutz ...................... | C09J 163/00 156/330 |

FOREIGN PATENT DOCUMENTS

| | | |
|---|---|---|
| WO | 2003054069 A1 | 7/2003 |
| WO | 2005118734 | 12/2005 |
| WO | 2008045270 A1 | 4/2008 |
| WO | 2009058295 | 5/2009 |
| WO | 2010098950 A1 | 9/2010 |

* cited by examiner

*Primary Examiner* — Daniel H Lee

(57) ABSTRACT

An uncured adhesive contains 2 to 10 weight percent of particles of a semi-crystalline organic material, preferably a polyester having a number-average molecular weight of 2000 to 10,000, a hydroxyl number of 10 to 60, and a melting temperature of 50 to 125° C. The adhesive is applied by heating it just prior to application, to melt the particles. After application, the adhesive is cooled to below the melting temperature of the semi-crystalline organic material, and then cured. The process allows the adhesive to be stored and pumped at ambient temperatures, due to the moderate viscosity of the material. Upon melting and re-cooling the semi-crystalline organic material, the adhesive assumes a high yield stress that imparts very good wash-off resistance. In preferred embodiments, the adhesive composition includes an epoxy resin and an epoxy curing agent.

11 Claims, No Drawings

STRUCTURAL ADHESIVES HAVING IMPROVED WASH-OFF RESISTANCE AND METHOD FOR DISPENSING SAME

This invention relates to processes for dispensing structural adhesives.

Structural adhesives are being used more and more extensively in the automotive industry. The use of adhesives is rapidly supplementing and in some cases even supplanting more conventional mechanical assembly methods such as welding, riveting, screwing, bolting, clamping, etc. These adhesives are being used even in structural applications, such as to join frame members together or to assemble other parts to frame members. In these structural applications, the adhesive plays an important role in the structural integrity of the vehicle. It is not sufficient that the adhesive bond does not fail during normal operation of the vehicle. In addition, the adhesive must be able to withstand the sudden and very large applied forces experienced in a crash situation. Adhesives designed to do this are sometimes known as "crash-durable" adhesives, or "CDAs".

These CDAs are curable systems containing precursor materials that after application undergo a curing reaction to form the needed adhesive bond between the substrates. In some manufacturing settings, the steps of applying the adhesive to the bondline and curing the adhesive may be separated widely in time. In assembling vehicle bodies, for example, the adhesive may be applied to the body assembly where it remains in an uncured state during one or more intermediate steps before it is cured. One of those intermediate steps often is a coating step in which a liquid coating material is applied, often by immersing the body assembly in the coating material. These coatings often require a bake cure. To save costs, manufacturers prefer to cure the adhesive and the coating at the same time.

This approach requires the adhesive to remain in place during those intermediate steps between application and cure. In particular, when one or more of those intermediate steps is a coating step, it becomes necessary for the adhesive to resist being washed off the substrate. This is a common failing of CDAs—they tend to wash off the substrate and then redeposit elsewhere. When the CDA redeposits on a show surface, it must be removed. This requires additional inspection and manufacturing steps. If the redeposited material cures, this often means that the part must be taken off-line and sanded down before final vehicle assembly.

The problem of redeposition is so significant that additives are sometimes added to the adhesive formulation in an attempt to combat the problem of washing off and redeposition. One type of additive is a semi-crystalline polyester polyol such as is described, for example, in WO 2010/098950. When the adhesive is formed, this polyol is melted and dissolved into the other components. This thickens the adhesive and improves wash-off resistance.

The high viscosities created by the inclusion of these create large problems in handling and applying the adhesive, especially in automated assembly plants where the adhesive is robotically applied. Precise metering and application generally requires low viscosities; it is very difficult for robotic equipment to handle very viscous materials. In addition, highly viscous adhesives are difficult to pump from centralized storage equipment through supply lines that feed the robotic equipment.

The industrial response to the handling problem is to install heated equipment. In this way, the highly viscous adhesive is warmed to reduce its viscosity so it can be pumped easily from storage through supply lines that feed the robotic dispensing equipment, and so the robotic equipment can handle it more easily. The adhesive then cools again after it is applied, regaining its high viscosity and thereby resisting wash-off. A major problem with this approach is its cost. The pumping, metering and dispensing equipment in an industrial facility is often quite complex, due in part to the use of centralized storage and pumping equipment which feeds what can be a large number of robotic application stations and sometimes simply because the raw material cannot be stored near the assembly lines and so must be pumped a sizable distance from storage to the point of application. The equipment often includes a long header system that carries the material from storage and pumping station to one or more "dosers" where it is metered. The header system may be 35 meters or more in length in some manufacturing facilities. From the doser, the adhesive is transferred through another hose, which may be 2 to 4 meters in length, to the application station. Adding heating devices to all of this equipment, especially the storage and/or header systems, can more than double capital costs. Heating this equipment also increases operating costs very significantly.

Another problem with using heated equipment is the elevated temperatures cause the adhesive to advance. Even though the adhesives are often formulated to cure only when heated to a specific "kick-off" temperature, in reality some advancement can and does occur at lower temperatures. Heating the adhesive in the pumping, metering and dispensing equipment can cause significant advancement to occur, even if the temperatures involved are well below the kick-off temperature. Industrially, it is common to keep the equipment full of heated adhesive even during periods when the equipment is not in operation. In these situations, the adhesive can experience prolonged periods at an elevated temperature, during which advancement can occur.

The advancement increases viscosity, which partially defeats the purpose of heating the adhesive in the first place. It also causes inconsistencies in the product, because the advancement is often localized spatially within the equipment, so different portions of the resin come to have different characteristics than other portions. These inconsistencies affect how the adhesive is applied and its properties when cured.

What is desired is a way to apply an adhesive composition that has acceptable wash-off resistance, while reducing costs and reducing premature advancement.

This invention is a method for applying an adhesive composition, comprising the steps of:

A. introducing an uncured adhesive composition into an automated dispensing system, wherein the uncured adhesive composition contains 2 to 10% by weight of a solid, particulate semi-crystalline organic material dispersed in a phase that is liquid at 20° C., wherein at least 90 weight % of the particles of the semi-crystalline organic material have a size of 250 nm to 500 μm, the semi-crystalline organic material has a crystalline melting temperature of 50 to 140° C., and wherein the uncured adhesive composition has a curing temperature greater than the crystalline melting temperature of the semi-crystalline organic material;

B. melting the semi-crystalline organic material by heating the uncured adhesive composition in the automated dispensing system to a temperature at least equal to the crystalline melting temperature of the semi-crystalline organic material but below the curing temperature of the uncured adhesive composition;

C. applying the heated uncured adhesive composition from the automated dispensing system to a substrate and then;

D. prior to curing the uncured adhesive composition, cooling the uncured adhesive composition on the substrate to below the melting temperature of the semi-crystalline organic material.

When in the form of particles, the semi-crystalline organic material contributes little if anything to the viscosity of the uncured adhesive. Accordingly, the viscosity is conveniently low until such time as the semi-crystalline organic material becomes melted. Because the viscosity is low before the particles of the semi-crystalline organic material have melted, the adhesive flows readily even at temperatures around room temperature, and it becomes unnecessary to heat it in order to pump it easily through dispensing equipment. The adhesive needs to be heated only at or just prior to the point of application, to melt the semi-crystalline organic material and thicken the uncured adhesive for application to the substrate. Once applied to the substrate, the adhesive cools, which increases its yield stress, thereby imparting excellent wash-off resistance to the applied adhesive until such time as it is cured. This process therefore greatly reduces heating requirements, as only certain portions of the dispensing equipment need to be heated. This results in a large savings in equipment cost and in operating expense.

In certain embodiments, the automated dispensing equipment may include storage apparatus for storing the uncured adhesive composition, a header system through which the uncured adhesive composition is transported to a doser which meters the uncured adhesive composition and one or more conduits which transfer the uncured adhesive composition from the doser to an application station, wherein step B is performed by applying heat at the doser, to the one or more conduits and/or at the application station and the storage and header system are maintained at a temperature such that the semi-crystalline organic material remains unmelted in the storage and header system.

In another aspect, the invention is an uncured adhesive composition comprising 1) 2 to 10% by weight of a solid, particulate semi-crystalline organic material having a crystalline melting temperature of 50 to 140° C., in which at least 90 weight % of the particles have a size of 250 nm to 500 µm;

the particles being dispersed in a phase that is liquid at 20° C. and which includes 2) at least one curable adhesive;

wherein the uncured adhesive composition further comprises 3) at least one elastomeric component selected from one or more of (a) a reactive toughener that has isocyanate groups that are blocked or capped with a phenolic compound, an aminophenolic compound, a primary or secondary aliphatic or cycloaliphatic amine, a benzyl alcohol, an aromatic amine, a benzyl amine or a thiol, (b) a rubber-modified epoxy resin and (c) a core-shell rubber;

wherein the adhesive composition has a curing temperature higher than the crystalline melting temperature of component 1), but not less than 80° C.

By "semi-crystalline", it is meant that the organic material is partially crystalline, i.e., contains domains of crystallized organic material that constitute 1 to 95%, preferably 5 to 90%, more preferably 10 to 75% of the weight of the organic material. The presence of these crystallites can be determined using thermal methods such as differential scanning calorimetry. The solid, particulate semi-crystalline organic material has a crystalline melting temperature of 50 to 140° C. A preferred melting temperature range is 55 to 80° C. The crystalline melting temperature of the semi-crystalline organic material is below the curing temperature of the adhesive. Preferably, the melting temperature is at least 10° C., at least 20° C. or at least 40° C. below the curing temperature. The semi-crystalline organic material preferably has a number average molecular weight (by GPC) of at least 250, preferably at least 350, even more preferably at least 1000, up to 50,000, preferably up to 25,000, more preferably up to 10,000.

The semi-crystalline organic material may contain functional groups that react with epoxy groups or with an epoxy curing agent when the adhesive is cured. The functional groups in some embodiments are hydroxyl groups, which may be aromatic (phenolic) or aliphatic hydroxyl groups.

One useful type of semi-crystalline organic material is a polyester polyol having a number average molecular weight of about 2000 to 10,000, a hydroxyl number of 10 to 60, and a melting temperature of 50 to 125° C. Preferred polyesters of this type have a number average molecular weight of 2500 to 8500 and a melting temperature of 50 to 80° C. Polyester polyols of this type are sold by Evonik under the trade name Dynacoll™. Specific examples are Dynacoll™ grades 7320, 7330, 7360, 7361, 7362, 7363, 7365, 7380 and 7381.

Another useful type of semi-crystalline organic material is a hydrogenated castor oil. Examples of commercially available such materials are Rheocin™ from Rockwood Additives and Rheotix 240 from Byk Industries.

Other useful semi-crystalline organic materials include polyamides, polyvinylbutyral, polymethylmethacrylate, and phenoxy resins.

The semi-crystalline organic material is present (prior to the melting step) in the uncured adhesive in the form of solid particles of which at least 95 weight percent have a size of 250 nm to 500 µm. Larger particles (such as granules or flakes in which certain of the semi-crystalline organic materials are supplied commercially) require longer times to melt (due in part to the time required for heat to diffuse through the particles), which in industrial equipment means that heat must be applied throughout more if not all of the system to melt the organic material, thereby increasing costs quite significantly. In some embodiments, at least 95 weight percent of the particles have a size from 500 nm to 350 µm, from 500 nm to 250 µm, or from 500 nm to 50 µm. Particle size is measured by sieving methods.

Because the semi-crystalline organic material must be present in the form of particles, the other components of the uncured adhesive cannot be strong solvents for the semi-crystalline organic material, nor should they be highly reactive with the semi-crystalline organic material, at temperatures below the melting temperature of the semi-crystalline organic material. In addition, the methods of manufacturing and storing the uncured adhesive (at such times as the semi-crystalline organic material are present) are chosen such that the semi-crystalline organic material remains in particulate form having particle sizes as described above. The manufacturing and storing methods required (at such times as the semi-crystalline organic material is present) are in general 1) temperatures below the crystalline melting temperature of the semi-crystalline organic material and 2) absence of solvents which dissolve the semi-crystalline organic material at temperatures below its crystalline melting temperature. It is generally preferable to manufacture (again at such times as the semi-crystalline organic material is present) and store the uncured adhesive at a temperature at least 10° C., more preferably at least 20° C. and still more preferably at least 30° below the crystalline melting temperature of the semi-crystalline organic material.

The adhesive composition contains at least one curable adhesive material, by which is meant at least one compound or mixture of compounds, preferably having a number average molecular weight of 2000 or below, which reacts during a curing step to form a high molecular weight polymer that bonds the cured adhesive to a substrate. The curable adhesive material may cure by reaction with itself or with a curing agent (or both).

A preferred type of curable adhesive material is an epoxy resin. In some embodiments, the adhesive composition contains at least one non-rubber-modified epoxy resin. A wide range of epoxy resins can be used as the non-rubber-modified epoxy resin, including those described at column 2 line 66 to column 4 line 24 of U.S. Pat. No. 4,734,332, incorporated herein by reference.

Suitable epoxy resins include the diglycidyl ethers of polyhydric phenol compounds such as resorcinol, catechol, hydroquinone, bisphenol, bisphenol A, bisphenol AP (1,1-bis(4-hydroxylphenyl)-1-phenyl ethane), bisphenol F, bisphenol K, and tetramethylbiphenol; diglycidyl ethers of aliphatic glycols and polyether glycols such as the diglycidyl ethers of $C_{2-24}$ alkylene glycols and poly(ethylene oxide) or poly(propylene oxide) glycols; polyglycidyl ethers of phenol-formaldehyde novolac resins, alkyl substituted phenol-formaldehyde resins (epoxy novolac resins), phenol-hydroxybenzaldehyde resins, cresol-hydroxybenzaldehyde resins, dicyclopentadiene-phenol resins and dicyclo-pentadiene-substituted phenol resins, and any combination thereof.

Suitable diglycidyl ethers include diglycidyl ethers of bisphenol A resins such as are sold by The Dow Chemical Company under the designations D.E.R.® 330, D.E.R.® 331, D.E.R.® 332, D.E.R.® 383, D.E.R. 661 and D.E.R.® 662 resins.

Commercially available diglycidyl ethers of polyglycols that are useful include those sold as D.E.R.® 732 and D.E.R.® 736 by The Dow Chemical Company.

Epoxy novolac resins can be used. Such resins are available commercially as D.E.N.® 354, D.E.N.® 431, D.E.N.® 438 and D.E.N.® 439 from The Dow Chemical Company.

Other suitable additional epoxy resins are cycloaliphatic epoxides. A cycloaliphatic epoxide includes a saturated carbon ring having an epoxy oxygen bonded to two vicinal atoms in the carbon ring, as illustrated by the following structure V:

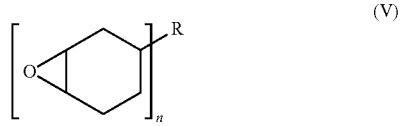

(V)

wherein R is an aliphatic, cycloaliphatic and/or aromatic group and n is a number from 1 to 10, preferably from 2 to 4. When n is 1, the cycloaliphatic epoxide is a monoepoxide. Di- or polyepoxides are formed when n is 2 or more. Mixtures of mono-, di- and/or polyepoxides can be used. Cycloaliphatic epoxy resins as described in U.S. Pat. No. 3,686,359, incorporated herein by reference, may be used in the present invention. Cycloaliphatic epoxy resins of particular interest are (3,4-epoxycyclohexyl-methyl)-3,4-epoxy-cyclohexane carboxylate, bis-(3,4-epoxycyclohexyl) adipate, vinylcyclohexene monoxide and mixtures thereof.

Other suitable epoxy resins include oxazolidone-containing compounds as described in U.S. Pat. No. 5,112,932. In addition, an advanced epoxy-isocyanate copolymer such as those sold commercially as D.E.R. 592 and D.E.R. 6508 (Dow Chemical) can be used.

The non-rubber-modified epoxy resin preferably is a bisphenol-type epoxy resin or mixture thereof with up to 10 percent by weight of another type of epoxy resin. The most preferred epoxy resins are bisphenol-A based epoxy resins and bisphenol-F based epoxy resins.

The non-rubber-modified epoxy resin may constitute at least 10 weight percent, at least 15 weight percent, or at least 20 weight percent of the adhesive composition. The non-rubber-modified epoxy resin may constitute up to 60 weight percent, up to 50 weight percent, or up to 40 weight percent of the adhesive composition.

In some embodiments, the adhesive contains at least one elastomeric component selected from one or more of (a) a reactive toughener that has isocyanate groups that are blocked or capped with a phenolic compound, an aminophenolic compound, a primary or secondary aliphatic or cycloaliphatic amine, a benzyl alcohol, an aromatic amine, a benzyl amine or a thiol, (b) rubber-modified epoxy resin and (c) a core-shell rubber.

The reactive toughener is a liquid or low-melting elastomeric material having isocyanate groups that are blocked or capped with a phenolic compound, an aminophenolic compound, a primary or secondary aliphatic or cycloaliphatic amine, a benzyl alcohol, an aromatic amine, a benzyl amine or a thiol. The capping or blocking group may contain additional functional groups such as phenols or aromatic amino groups, but the capping or blocking group may instead be devoid of such groups. The reactive toughener should be soluble or dispersible in the remainder of the reactive components of the adhesive composition. Tougheners of these types and methods for preparing them are described, for example, in EP 308 644, U.S. Pat. Nos. 5,202,390, 5,278,257, WO 2005/118734, U.S. Published Patent Application No. 2005/0070634, U.S. Published Patent Application No. 2005/0209401 and U.S. Published Patent Application 2006/0276601. The elastomeric portion of the reactive toughener advantageously includes a polyether, polybutadiene or polyester segment. The polyether, polybutadiene or polyester segment may form part of a polyurethane and/or polyurea backbone.

The reactive toughener preferably has a viscosity at 45° C. which is not greater than 1000 Pa·s and more preferably no more than about 800 Pa·s. Preferably, the weight average molecular weight of the toughener (by GPC) is about 8,000 or greater, and more preferably about 10,000 or greater. Preferably, the molecular weight of the toughener is about 70,000 or less, and more preferably about 40,000 or less.

The reactive toughener preferably contains an average of no more than 6 blocked or capped terminal groups per molecule. Preferably the average number of such groups is at least 1, more preferably at least 2, up to about 4 per molecule.

The reactive toughener is preferably non-crosslinked or lightly crosslinked, preferably having a crosslink density of about 2 or less and preferably about 1 or less. Crosslink density is the average number of attachments between chains of polymers.

Preferred reactive tougheners are isocyanate-terminated prepolymers formed form a polyether polyol and an aliphatic polyisocyanate, in which the terminal isocyanate groups are blocked with a phenol, aminophenol, polyphenol or an allylphenol such as o,o-diallyl bisphenol A.

When present, the reactive toughener may constitute at least 5 weight percent, at least 8 weight percent, or at least 12 weight percent of the adhesive composition. The reactive toughener may constitute up to 40 weight percent or up to about 30 weight percent of the adhesive composition.

The rubber-modified epoxy resin is a reaction product of an epoxy resin and at least one liquid rubber that has epoxide-reactive groups, such as amino or preferably carboxyl groups. The resulting adduct has reactive epoxide groups which can be cured further when the adhesive composition is cured. The liquid rubber may have a glass transition temperature ($T_g$) of −40° C. or lower, especially −50° C. or lower. Preferably, each of the rubbers (when more than one is used) has a glass transition temperature of −25° C. or lower. The rubber $T_g$ may be as low as −100° C. or even lower.

The liquid rubber is preferably a homopolymer of a conjugated diene or copolymer of a conjugated diene, especially a diene/nitrile copolymer. The conjugated diene rubber is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized nitrile monomer.

The rubber preferably contains from about 1.5, more preferably from about 1.8, to about 2.5, more preferably to about 2.2, of epoxide-reactive terminal groups per molecule, on average. Carboxyl-terminated rubbers are preferred. The molecular weight ($M_n$) of the rubber is suitably from about 2000 to about 6000, more preferably from about 3000 to about 5000, by GPC.

Suitable carboxyl-functional butadiene and butadiene/acrylonitrile rubbers are commercially available from Noveon under the tradenames Hycar® 2000X162 carboxyl-terminated butadiene homopolymer, Hycar® 1300X31, Hycar® 1300X8, Hycar® 1300X13, Hycar® 1300X9 and Hycar® 1300X18 carboxyl-terminated butadiene/acrylonitrile copolymers. A suitable amine-terminated butadiene/acrylonitrile copolymer is sold under the trade name Hycar® 1300X21.

The rubber is formed into an epoxy-terminated adduct by reaction with an excess of an epoxy resin. A wide variety of epoxy resins can be used to make the rubber-modified epoxy resin, including any of those described above. Preferred polyepoxides are liquid or solid glycidyl ethers of a bisphenol such as bisphenol A or bisphenol F. Enough of the epoxy resin is provided to react with substantially all of the epoxide-reactive groups on the rubber and to provide free epoxide groups on the resulting adduct without significantly advancing the adduct to form high molecular weight species. A ratio of at least two equivalents of epoxy resin per equivalent of epoxy-reactive groups on the rubber is preferred. More preferably, enough of the epoxy resin is used that the resulting product is a mixture of the adduct and some free epoxy resin.

The rubber-modified epoxy resin(s), when present, may constitute at least 4 weight percent or at least 5 weight percent of the adhesive composition. The rubber-modified epoxy resin may constitute up to 30 weight percent, up to about 20 weight percent or up to about 15 weight percent of the adhesive composition.

The core-shell rubber is a particulate material having a rubbery core. The rubbery core preferably has a $T_g$ of less than −20° C., more preferably less than −50° C. and even more preferably less than −70° C. The $T_g$ of the rubbery core may be below −100° C. The core-shell rubber also has at least one shell portion that preferably has a $T_g$ of at least 50° C. By "core", it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material is preferably grafted onto the core or is crosslinked. The rubbery core may constitute from 50 to 95%, especially from 60 to 90%, of the weight of the core-shell rubber particle.

Suitable core-shell rubbers are described, for example, in, U.S. Pat. No. 8,088,245 and EP 1 632 533 A1. Core-shell rubber particles as described in EP 1 632 533 A1 include a crosslinked rubber core, in most cases being a crosslinked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in EP 1 632 533 A1.

Preferred core-shell rubbers include those sold by Kaneka Corporation under the designation Kaneka Kane Ace, including Kaneka Kane Ace MX 156 and Kaneka Kane Ace MX 120 core-shell rubber dispersions. These products contain the core-shell rubber particles pre-dispersed in an epoxy resin, at a concentration of approximately 25%. The epoxy resin contained in those products will form all or part of the non-rubber-modified epoxy resin component of the adhesive composition of the invention.

Core-shell rubber particles, when present, may constitute 1 to 15 weight percent of the adhesive composition. The core-shell rubber particles may constitute at least 2 weight percent, at least 2.5 weight percent or at least 3 weight percent of the adhesive composition. The core-shell rubber particles may constitute no more than 12 weight percent or no more than 8 weight percent of the adhesive composition.

The total rubber content of the adhesive composition (if any) can range from as little as 1 weight percent, preferably 2.5 weight percent, to as high as 30 weight percent. Total rubber content is calculated by determining the weight of any core-shell rubber, plus the weight contributed by the liquid rubber portion of any rubber-modified epoxy resin as may be used. In each case, the weight of unreacted (non-rubber-modified) epoxy resins and/or other carriers, diluents, dispersants or other ingredients that may be contained in the core-shell rubber product or rubber-modified epoxy resin is not included. The weight of the shell portion of the core-shell rubber is counted as part of the total rubber content for purposes of this invention.

The adhesive composition in some embodiments contains a curing agent. The curing agent is selected together with any catalysts such that the adhesive has a curing temperature higher than the melting temperature of the semi-crystalline organic material. The curing temperature, for purposes of this invention, is the minimum temperature to which rapid the adhesive composition must be heated to cure rapidly, as indicated, for example, by a doubling in viscosity within 5 minutes, preferably within 2 minutes, at that temperature. The curing temperature preferably is at least 10° C., more preferably at least 20° C., still more preferably at least 30° C., above the melting temperature of the semi-crystalline organic material.

In preferred adhesives that contain an epoxy resin, suitable curing agents include materials such as boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and 4,4'-diaminodiphenylsulphone is particularly preferred.

The curing agent is used in a sufficient amount to cure the composition. In the case of an epoxy curing agent, for example, the curing agent may constitute at least about 1.5 weight percent, at least about 2.5 weight percent or at least 3.0 weight percent of the adhesive composition. An epoxy curing agent may constitute up to about 15 weight percent up to about 10 weight percent or up to about 8 weight percent of the adhesive composition.

The adhesive composition will in most cases contain a catalyst to promote the curing reaction(s). Useful catalysts for curing an epoxy resin are ureas such as p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N',N'-dimethylurea (Chlortoluron), tert-acryl- or alkylene amines like benzyldimethylamine, 2,4,6-tris(dimethylaminomethyl)phenol, piperidine or derivates thereof, imidazole derivates, in general $C_1$-$C_{12}$ alkylene imidazole or N-arylimidazols, such as 2-ethyl-2-methylimidazol, or N-butylimidazol, 6-caprolactam, a preferred catalyst is 2,4,6-tris(dimethylaminomethyl)phenol integrated into a poly(p-vinylphenol) matrix (as described in European patent EP 0 197 892). The catalyst may be encapsulated or otherwise be a latent type which becomes active only upon exposure to elevated temperatures. The catalyst may constitute at least about 0.1 weight percent or at least about 0.5 weight percent of the adhesive composition. The epoxy curing catalyst may constitute up to 2 weight percent, up to 1.0 weight percent, or up to 0.7 weight percent of the adhesive composition.

The adhesive composition may contain various optional components.

A filler and/or pigment may be present in the adhesive composition. Examples of these materials include calcium carbonate, calcium oxide, talc, coal tar, carbon black, textile fibers, glass particles or fibers, aramid pulp, boron fibers, carbon fibers, mineral silicates, mica, powdered quartz, hydrated aluminum oxide, bentonite, wollastonite, kaolin, fumed silica, silica aerogel, metal powders such as aluminum powder or iron powder, or expanded or expandable microballons having an average particle size of up to 200 µm and density of up to 0.2 g/cc. Among these, calcium carbonate, talc, calcium oxide, fumed silica and wollastonite and microballons having a particle size preferably about 25 to 150 µm and a density from about 0.05 to about 0.15 g/cc are preferred, either singly or in some combination.

Fillers and pigments, when present, may constitute at least 5 weight percent or at least 10 weight percent of the adhesive composition. They may constitute up to 25 weight percent, up to about 20 weight percent or up to about 15 weight percent of the adhesive composition.

The adhesive composition can further contain other additives such as a bisphenol component, diluents, plasticizers, extenders, pigments and dyes, fire-retarding agents, adhesion promoters and antioxidants.

In certain aspects of this invention, the adhesive composition is applied using an automated dispensing system. The adhesive is introduced into the dispensing system and heated within the automated dispensing system. Enough heat is applied to melt the semi-crystalline organic material particles while keeping the temperature of the adhesive below the curing temperature of the uncured adhesive composition. In this way, the particles are melted, thereby tending to increase the viscosity of the adhesive and (after application and cooling) increasing the yield strength of the adhesive as well. The viscosity increase attributable to the melting of the semi-crystalline organic material is counteracted at least partially by the thermally-induced reduction of viscosity, so the net effect on viscosity may be small, zero or even negative.

Once the particles have been melted, the heated uncured adhesive composition is applied from the automated dispensing system to a substrate. Its temperature at the time of application is at or above the melting temperature of the semi-crystalline organic material, so the semi-crystalline organic material is molten at the time of application. Once applied, the uncured adhesive composition is cooled on the substrate to below the melting temperature of the semi-crystalline organic material. When cooled, the semi-crystalline organic material significantly increases the yield stress of the applied uncured adhesive, which produces the desired effect of increasing its wash-off resistance.

For example, in some embodiments, the uncured adhesive prior to melting the semi-crystalline organic material particles, may have a viscosity of 1000 Pa·s or less, such as 500 to 1000 Pa·s, at 20° C. at a shear rate of 3 $s^{-1}$, and may have a viscosity of 400 Pa·s or less, such as from 200 to 400 Pa·s or from 250 to 350 Pa·s, at 30° C. and a shear rate of 3 $s^{-1}$. By contrast, an otherwise like adhesive in which the semi-crystalline organic material has been melted and blended into the other components typically exhibits a viscosity of 1200 to 2000 Pa·s or more at 20° C. at the same shear rate. Thus, this invention often reduces the viscosity of the uncured adhesive by a factor of two or more.

An important advantage of the invention is the adhesive needs to be heated only immediately before being dispensed onto the substrate. By providing the semi-crystalline organic material in the form of discrete particles, they contribute almost nothing to the viscosity of the uncured adhesive. Therefore, there is no need to heat the adhesive to reduce its viscosity to make it easy to pump and dispense. It is not necessary to heat the entire dispensing apparatus, or to heat vessels or supply lines that immediately feed the automated dispensing apparatus. Instead, heating is needed only at or near the point at which the adhesive composition is dispensed from the apparatus.

Heating can be applied, for example, by applying heat to the dispensing head of the automated dispensing system and/or lines that immediately supply the dispensing head. The dispensing head is that portion of the automated dispensing system that discharges the adhesive from the system onto the substrate. The dispensing head may consist of or include a nozzle. The dispensing head may be and is preferably heated.

Alternatively or in addition, the adhesive composition can be heated by supplying mechanical energy. For example, the adhesive can be passed through a dynamic mixer that can be located at or proximate to the dispensing head. A combination of applied heat and mechanical may be used to heat the adhesive composition.

In certain embodiments, the automated dispensing equipment includes storage apparatus for storing the uncured adhesive composition, a header system through which the uncured adhesive composition is transported to one or more dosers that meter the uncured adhesive composition, and one or more conduits though which the metered adhesive composition is transferred from each doser to a corresponding application station which includes a dispensing head. The header system in some embodiments includes one or more conduits from the storage apparatus to the doser(s), the conduits each being, for example, 10 to 75 meters, especially 35 to 50 meters, in length. The conduits between dosers and corresponding application stations may be, for example, 1 to 10 or 2 to 4 meters in length. The application station preferably is robotically controlled to dispense the heated adhesive composition onto the substrate. In such an apparatus, the doser(s) meter the needed amount of adhesive in each instance of adhesive application. In such apparatus, the heating step B may be performed by applying heat and/or mechanical energy at the doser, to the conduit(s) leading from each doser to each corresponding application station, and/or at the application station (including, for example, the dispensing head). Preferably the storage and header system are maintained at a temperature below the melting temperature of the semi-crystalline organic material. This temperature is preferably no greater than 35° C. and may be, for example, 0 to 30° C. In such an apparatus, the adhesive remains unheated and the semi-crystalline organic material particles remain unmelted in the storage and header system, and thus the equipment and operating expense of heating those portions of the apparatus are avoided.

The heated adhesive is dispensed onto a substrate. Typically, the substrate is to be married to a second substrate to which it is to be adhered. The adhesive may be applied to either or both of such substrates. The substrates are contacted such that the adhesive is located between and in contact with the substrates to be bonded together, forming a bondline. Upon application to the substrate(s), the adhesive is cooled to below the melting temperature of the semi-crystalline organic material. This leads to a significant increase in yield stress as described before. The Casson yield stress of the adhesive prior to the melting step B may be, for example, in the range of 125 Pa or less, such as from 50 to 125 Pa or 75 to 110 Pa. After re-cooling, the yield stress of the uncured adhesive is typically increased by a factor of 2 to 15 compared to that of the adhesive prior to the melting step B, so that the Casson yield stress upon cooling may become 200 Pa or more. In some embodiments, the Casson yield stress is 200 to 1500 Pa, 300 to 1000 Pa, 500 to 1000 Pa or 600 to 800 Pa.

The substrate may be, for example, wood, metal, coated metal, aluminum, a variety of plastic and filled plastic substrates, fiberglass and the like. In one preferred embodiment, the adhesive is used to bond parts of automobiles together, such as frame members to frame members or other parts to frame members. Such parts can be steel, coated steel, galvanized steel (such as electrogalvanized, hot-dip zinc coated steel or zinc/iron (galvaneal)-coated steel), aluminum, coated aluminum, plastic and filled plastic substrates.

After application and cooling as described above, the adhesive composition is cured by heating it to a curing temperature as described before. Generally, the curing temperature is about 80° C. or above, preferably about 100° C. or above. Preferably, the temperature is about 220° C. or less, and more preferably about 180° C. or less.

Assembled automotive frame members often are coated with a coating material that requires a bake cure. The coating is typically baked at temperatures that may range from 140° C. to over 200° C. In such cases, it is often convenient to apply the adhesive composition to the frame components as described above, then apply the coating, and cure the adhesive when the coating is baked and cured.

The following examples are provided to illustrate the invention but are not intended to limit the scope thereof. All parts and percentages are by weight unless otherwise indicated.

Products used in the following examples are identified as follows:

The Epoxy Resin is DER™ 330, which is a liquid diglycidyl ether of bisphenol A, available from The Dow Chemical Company. It has an epoxy equivalent weight of approximately 180.

The Rubber-Modified Epoxy Resin is a reaction product of approximately 80% of a liquid diglycidyl ether of bisphenol F and 20% of Hycar 1300X13 rubber (a carboxy-terminated butadiene-acrylonitrile copolymer having a $T_g$ below −40° C., available from Noveon). It is commercially available as EP 815 from Huntsman Chemical Company.

The Toughener is an isocyanate-terminated polyurethane prepolymer prepared from a polyether polyol and an aliphatic diisocyanate, in which the isocyanate groups are capped with o,o-diallyl bisphenol A, as described in Example 13 of EP 308 664.

Cardura™ N10 is versatic acid monoepoxy ester available from Shell Chemicals.

The Epoxy Silane is RAM 1087 available from Huntsman Chemical Company.

The Dicyanamide is Amicure™ CG-1200 epoxy hardener available from Air Products and Chemicals.

The Fumed Silica is Cab-O-Sil TS720 available from Cabot Corporation.

TDAMP is tris (2,4,6-dimethylaminomethyl)phenol in a poly(vinylphenol) matrix as described in U.S. Pat. No. 5,021,513.

Accelerine 2191 is a diethylene triamine catalyst from Celerity LLC.

Dynacoll 7330 is a semi-crystalline polyester polyol available from Evonik. It has a molecular weight of 3500, a hydroxyl number of 27 to 34 and a melting temperature of 80 to 85° C.

The Dynacoll powder is produced by grinding the material as received with the fumed silica at a weight ratio of 85.6:14.4 in a ball mill to produce particles that have sizes between 0.5 and 30 µm. 5.8 parts by weight of this powder contains about 5 parts Dynacoll 7330 and 0.8 parts fumed silica.

The Dynacoll/Epoxy Resin premix is a mixture of 80% of DER 330 and 20% Dynacoll 7330. It is made by mixing the materials above the melting temperature of the Dynacoll 7330 material so it loses its particulate nature.

Rheocin is a hydrogenated derivative of castor oil, available from Rockwood Industries. It has a melting temperature between about 35 and 50° C.

Rheotix 240 is a hydrogenated derivative of castor oil, available from Byk Industries. It has a melting temperature between 35 and 50° C.

EXAMPLES 1-3 AND COMPARATIVE EXAMPLES C-1 AND C-2

Examples 1-3 and Comparative Samples C-1 and C-2 are made from the following formulations:

TABLE 1

| Ingredient | Parts By Weight | | | | |
| --- | --- | --- | --- | --- | --- |
| | Comp. C-1 | Comp. C-2 | Ex. 1 | Ex. 2 | Ex. 3 |
| Epoxy Resin | 40.7 | 20.7 | 39.9 | 40.7 | 40.7 |
| Rubber-Modified Epoxy | 20.2 | 20.2 | 20.2 | 20.2 | 20.2 |
| Toughener | 15.5 | 15.5 | 15.5 | 15.5 | 15.5 |
| Cardura N10 | 1.0 | 1.0 | 1.0 | 1.0 | 1.0 |
| Epoxy Silane | 0.6 | 0.6 | 0.6 | 0.6 | 0.6 |
| Pigment | 0.1 | 0.1 | 0.1 | 0.1 | 0.1 |

TABLE 1-continued

| | Parts By Weight | | | | |
|---|---|---|---|---|---|
| Ingredient | Comp. C-1 | Comp. C-2 | Ex. 1 | Ex. 2 | Ex. 3 |
| Dicyanamide | 4.8 | 4.8 | 4.8 | 4.8 | 4.8 |
| Calcium Oxide | 2.0 | 2.0 | 2.0 | 2.0 | 2.0 |
| Calcium Carbonate | 5.5 | 5.5 | 5.5 | 5.5 | 5.5 |
| Talc | 0.3 | 0.3 | 0.3 | 0.3 | 0.3 |
| Fumed Silica | 8.5 | 3.5 | 3.5 | 3.5 | 3.5 |
| TDAMP | 0.8 | 0.8 | 0 | 0.8 | 0.8 |
| Accelerine 2191 Catalyst | 0 | 0 | 0.8 | 0 | 0 |
| Dynacoll/Epoxy Resin Premix | 0 | 25 | 0 | 0 | 0 |
| Dynacoll Powder | 0 | 0 | 5.8 | 0 | 0 |
| Rheocin | 0 | 0 | 0 | 5 | 0 |
| Rheotix 240 | 0 | 0 | 0 | 0 | 5 |

To produce Comparative Samples C-1 and C-2, the ingredients are mixed on a planetary mixer for about 5 minutes. Waste heat raises the temperature of the mixture to about 50° C. A scrape-down is performed, and the components are mixed further for 30 minutes under vacuum. In Comparative Sample C-2, the Dynacoll 7330 is not present in particulate form.

To produce Example 1, the ingredients are mixed, taking care to maintain the temperature at 30° C. or below to avoid any softening or melting of the Dynacoll 7330 particles. As a result, the product is a dispersion in which the Dynacoll 7330 is present in the form of fine particles. The different catalyst used in this example is due to the melting temperature of the Dynacoll 7330. The TDAMP catalyst used in the other formulations becomes activated near the melting temperature of Dynacoll 7330; to avoid premature curing, this catalyst is replaced in Example 1 with Accelerine 2191, which becomes activated at a higher temperature. This allows the particle melting step to be performed without curing the adhesive.

Examples 2 and 3 are prepared in the same general manner as Example 1, maintaining the temperature below the melting temperature of the semi-crystalline organic material in each case. Because the semi-crystalline organic materials used here have melting temperatures below about 50° C., the TDAMP catalyst can be used in these formulations without causing the adhesive to cure during the particle melting step.

The viscosity of each of Examples 1-3 and Comparative Samples C-1 and C-2 is measured at 20° C. and 30° C., in each case at a shear rate of 3 $s^{-1}$. Results are as reported in Table 2 below.

The Casson yield stress for each of the samples is measured, with results as indicated in Table 2.

Each of the samples is then heated for five minutes at the temperature indicated in Table 2. In the case of Examples 1-3, this heating regimen is sufficient to melt the particles of the semi-crystalline organic material without curing the adhesive. The material is then cooled, and the viscosity at 20° C. (3 $s^{-1}$ shear rate) and Casson yield stress are again measured. Results are as indicated in Table 2.

Test specimens for testing lap shear strength, 23° C. impact peel strength and −40° impact peel strength are prepared from each of the samples. For lap shear strength testing, test specimens are prepared and tested in accordance with DIN EN 1465, using a bonding area of 25×10 mm, an adhesive layer thickness of 0.2 mm and a test speed of 10 mm/min. The substrate is 0.8 mm cold rolled steel that is solvent cleaned to remove any oil. For impact peel strength testing, specimens are prepared and tested in accordance with ISO 11343, using a bonding area of 30×20 mm, an adhesive layer thickness of 0.2 mm and a test speed of 2 m/s. The samples are brought back to about 23° C. for testing unless otherwise indicated.

TABLE 2

| Test Condition/Property | Comp. C-1 | Comp. C-2 | Ex. 1 | Ex. 2 | Ex. 3 |
|---|---|---|---|---|---|
| Initial Viscosity, 20° C., Pa · s | 1625 | 1246 | 754 | 803 | 735 |
| Initial Viscosity, 30° C., Pa · s | 853 | 551 | 294 | 332 | N.D. |
| Initial Casson Yield Stress, Pa | 621 | 177 | 71 | 105 | 85 |
| Heating Temperature, ° C. | 70 | 70 | 83 | 60 | 60 |
| Post-heating Viscosity, 20° C., Pa · s | 1718 | 1353 | 1790 | 1147 | 1065 |
| Post-heating Casson Yield Stress, Pa | 550 | 318 | 724 | 230 | 204 |
| % Increase Yield Stress | −11.4 | 80 | 1020 | 383 | 340 |
| Lap Shear Strength, MPa | 18.4 | 18.5 | 18.4 | 18.6 | Not Determined |
| Impact Peel Strength, N/mm | 30.9 | 39.6 | 30.2 | 37.2 | Not Determined |

Example 1 demonstrates the advantages of this invention. Prior to performing the melting step, this sample has a viscosity very much lower than that of the Comparative Samples. The viscosity of Example 1 is lower at 20° C. than that of the Comparative Samples at 30° C. This lower viscosity removes the need to heat the adhesive so it can be pumped easily through the header system of automatic processing equipment. The Casson yield stress of the adhesive prior to the melting step is very much lower than that of the Comparatives, which is consistent with the particulate form of the Dynacoll 7330 material. This presents no difficulty, as a high Casson yield stress in not needed until the adhesive is applied to the substrate. In Example 1, Casson yield stress is sacrificed at a point in time when it is not needed, in exchange for a large benefit in viscosity.

Once Example 1 undergoes the heating step, its viscosity increases to become similar to that of the Comparative Samples. This is consistent with the melting of the Dynacoll 7330 particles. Yield stress also increases to actually become greater than those of the Comparative Samples. Thus, this invention provides a material and process which allows for a low viscosity material to be handled without applied heat until just prior to application, where heat is applied to melt the dispersed particles of semi-crystalline organic material, thereby increasing the yield stress and wash-off resistance.

Examples 2 and 3 show similar effects, although the effects in these cases are not as pronounced as with Example 1. This may be due to the lower crystalline temperature of the semi-crystalline organic material, compared to that used in Example 1. Providing the semi-crystalline organic material in the form of solid particles reduces viscosity until the heating step is performed, at which point the yield stress and viscosity increase on demand to produce an adhesive that is highly resistant to wash-off.

The invention claimed is:

1. A method for applying an adhesive composition, comprising the steps of:
   A. introducing an uncured adhesive composition into an automated dispensing system, wherein the uncured adhesive composition contains 2 to 10% by weight of a solid, particulate semi-crystalline organic material dispersed in a phase that is liquid at 20° C., wherein at least 90 weight-% of the particles of the semi-crystalline organic material have a size of 250 nm to 500 µm, the semi-crystalline organic material has a crystalline melting temperature of 50 to 140° C., wherein the uncured adhesive composition has a curing temperature greater than the crystalline melting temperature of the semi-crystalline organic material and wherein the uncured adhesive composition has a viscosity of 1000 Pa×s or less at 20° C. at a shear rate of 3 s$^{-1}$, a viscosity of 400 Pa×s or less at 30° C. and a shear rate of 3 s$^-$, and a Casson yield stress of 125 Pa or less;
   B. melting the semi-crystalline organic material by heating the uncured adhesive composition in the automated dispensing system to a temperature at least equal to the crystalline melting temperature of the semi-crystalline organic material but below the curing temperature of the uncured adhesive composition;
   C. applying the heated uncured adhesive composition from the automated dispensing system to either or both of two substrates and contacting the substrates such that the uncured adhesive composition is located between and in contact with the substrates to be bonded together, forming a bondline and then;
   D. prior to curing the uncured adhesive composition, cooling the uncured adhesive composition on the substrate to below the melting temperature of the semi-crystalline organic material, wherein the Casson yield stress of the uncured adhesive composition after cooling is 200 to 1500 Pa and then
   E. curing the adhesive composition on the substrate.

2. The method of claim 1, wherein the automated dispensing equipment includes storage apparatus for storing the uncured adhesive composition, a header system through which the uncured adhesive composition is transported to one or more dosers which meter the uncured adhesive composition, and one or more conduits through which the metered adhesive composition is transferred from each doser to a corresponding application station, wherein step B is performed by applying heat and/or mechanical energy at the doser(s), the one or more conduits and/or the application station(s), and the storage and header system are maintained at a temperature below the melting temperature of the semi-crystalline organic material.

3. The method of claim 1, wherein the storage and header system are maintained at a temperature of no greater than 35° C.

4. The method of claim 1, wherein the semi-crystalline organic material is a polyester having a number average molecular weight of 2000 to 10,000, a hydroxyl number of 10 to 60, and a melting temperature of 50 to 125° C.

5. The method of claim 4 wherein the polyester has a number average molecular weight of 2500 to 8500 and a melting temperature of 50 to 80° C.

6. The method of claim 1, wherein the adhesive composition includes an epoxy resin and an epoxy curing agent.

7. The method of claim 6, wherein the adhesive composition further includes at least one elastomeric component selected from one or more of (a) a reactive toughener that has isocyanate groups that are blocked or capped with a phenolic compound, an aminophenolic compound, a primary or secondary aliphatic or cycloaliphatic amine, a benzyl alcohol, an aromatic amine, a benzyl amine or a thiol, (b) rubber-modified epoxy resin and (c) a core-shell rubber.

8. The method of claim 1, wherein at least one of the two substrates is a vehicular frame member.

9. The method of any claim 8, wherein the two substrates and applied adhesive composition are coated by immersion into a coating, and the coating and adhesive composition are cured at the same time.

10. The method of claim 1, wherein at least one of the two substrates is a vehicular frame member.

11. The method of claim 1 wherein at least 95 weight percent of the particles have a size of 500 nm to 50 µm.

* * * * *